(12) United States Patent
Kawai et al.

(10) Patent No.: US 7,528,561 B2
(45) Date of Patent: May 5, 2009

(54) LINEAR DRIVE APPARATUS

(75) Inventors: Tomohiko Kawai, Yamanashi (JP);
Kenzo Ebihara, Yamanashi (JP);
Osamu Matsuura, Yamanashi (JP)

(73) Assignee: Fanuc Ltd, Yamanishi (JP)

( * ) Notice: Subject to any disclaimer, the term of this patent is extended or adjusted under 35 U.S.C. 154(b) by 267 days.

(21) Appl. No.: 11/672,513

(22) Filed: Feb. 7, 2007

(65) Prior Publication Data
US 2007/0188118 A1  Aug. 16, 2007

(30) Foreign Application Priority Data
Feb. 14, 2006  (JP)  ............... 2006-036802

(51) Int. Cl.
*H02K 41/00* (2006.01)
(52) U.S. Cl. .................. 318/135; 318/115; 310/12; 310/13; 310/14
(58) Field of Classification Search ................. 318/135, 318/115; 310/12
See application file for complete search history.

(56) References Cited

U.S. PATENT DOCUMENTS

| | | | | |
|---|---|---|---|---|
| 5,565,718 | A | * | 10/1996 | Takei ........................... 310/12 |
| 5,779,367 | A | | 7/1998 | Obara |
| 6,008,552 | A | * | 12/1999 | Yagoto et al. ................. 310/12 |
| 6,381,527 | B1 | * | 4/2002 | Furumi et al. ................. 701/41 |

FOREIGN PATENT DOCUMENTS

| | | |
|---|---|---|
| JP | 02097863 U | 8/1990 |
| JP | 03093454 A | 4/1991 |
| JP | 06054516 A | 2/1994 |
| JP | 06 070534 A1 | 3/1994 |
| JP | 11-215795 A | 8/1999 |
| JP | 2000 139069 A1 | 5/2000 |
| JP | 2004 166398 A1 | 6/2004 |

OTHER PUBLICATIONS

Notice of Reasons for Rejection mailed Sep. 18, 2007 for Patent Application No. 2006-036802.
EP Search Report for EP 07 00 2637 mailed Jun. 8, 2007.

* cited by examiner

*Primary Examiner*—Rita Leykin
(74) *Attorney, Agent, or Firm*—Lowe, Hauptman, Ham & Berner, LLP

(57) ABSTRACT

A linear drive apparatus comprising: a guide having an internal body; a slider moved along the guide, a driving mechanism for generating a driving force by magnetic interaction of the slider with the guide so as to linearly drive the slider; and a magnetic measurement unit having a magnetic scale and a detector which are opposed to each other and change a relative position relative to each other in order to obtain the relative position of the slider relative to the guide, wherein an opposing direction of the magnetic scale and the detector is the direction of the outer circumference of the guide, and the detector detects a signal from the magnetic scale in accordance with the relative position of the slider, whereby the relative position of the slider is obtained.

5 Claims, 2 Drawing Sheets

LINEAR DRIVE APPARATUS

CROSS REFERENCE TO RELATED APPLICATION

The present application claims priority of Japanese Patent Application No. 2006-036802 filed on Feb. 14, 2006, disclosure of which is incorporated, by reference, in its entirety.

BACKGROUND OF THE INVENTION

1. Field of the Invention

The present invention relates to a linear drive apparatus that is used in a machine tool or a measuring apparatus having a guide, a slider that is moved along the guide by a driving mechanism, and a magnetic measurement unit for measuring the relative position of the slider relative to the guide.

2. Related Art

In a linear drive apparatus comprising a guide and a slider that is moved along the guide by a driving mechanism, an optical measurement unit is generally used to measure the relative position of the slider relative to the guide. Such an optical measurement unit generally has a light source, an optical scale, and a light receiving section. However, there are problems with such optical measuring units in that they are inappropriate for measurement, especially for in-process measurement, in a degraded environment where coolant or chips are present, and that they cannot be applied to wet processing of small articles.

On the other hand, it is known that a magnetic measurement unit having a magnetic scale and a detector are less sensitive to a degraded environment than an optical measurement unit. A magnetic measurement unit has a magnetic scale and a detector that are opposed to each other and change position relative to each other, and the detector detects a signal from the magnetic scale in accordance with the position of a slider for measuring the position of the slider.

However, when the magnetic scale is mounted to a slider or the like that is driven by a linear motor mechanism, the magnetic scale is likely to be affected by the magnetic force generated by a coil or a magnet, and this may lead to a problem of detecting an accurate position. Therefore, a magnetic measurement unit including a magnetic scale has to be mounted at a position sufficiently far away from a coil or magnet, so that precision higher than a certain level cannot be achieved in detecting a position.

In order to overcome the above-described problem that a magnetic measurement unit is likely to be affected by the magnetic force in the surroundings, and therefore cannot detect an accurate position, a method in which a magnetic shield is mounted to the magnetic scale, and a method as disclosed in Japanese Patent Publication No. 11-215795 (JP-A-11-215795) in which another magnet is provided between the magnetic scale and the coil or the magnet so as to cancel the magnetic force generated by the coil or the magnet, have been proposed. These methods, however, lead to another problem that, since a magnetic shield or a coil is added to the apparatus, it becomes difficult to reduce the size or weight of the apparatus.

SUMMARY OF THE INVENTION

In view of the above-described problem, it is an object of the present invention to provide a linear drive apparatus having a magnetic measurement unit that is capable of reducing the influence of an external magnetic field on detection of the position of a movable member.

In order to attain the above object, in accordance with the present invention, there is provided a linear drive apparatus comprising, a guide, a slider moved along the guide, a driving mechanism for driving the slider in a straight line, and a magnetic measurement unit having a magnetic scale and a detector that are opposed and change a relative position relative to each other for obtaining the relative position of the slider relative to the guide, wherein a direction of opposition of the magnetic scale and the detector intersects the direction of the magnetic force of the surrounding external magnetic field, and the detector detects a signal from the magnetic scale in accordance with the relative position of the slider, whereby the relative position of the slider is obtained.

In accordance with the invention, since the direction of the opposition of the magnetic scale and the detector intersects the direction of magnetic force of the surrounding external magnetic field, the direction of the magnetization of the magnetic scale and the direction in which the detector detects the magnetic force intersect the direction of the magnetic force of the surrounding external magnetic field, so that interference of the external magnetic field with the detected signal is reduced. Therefore, even in the presence of an external magnetic field, the relative position of the slider can be measured accurately by the magnetic measurement unit and positional precision of the linear drive apparatus can be improved.

In accordance with the present invention, there is also provided a linear drive apparatus comprising, a guide having a magnetic body in the inside, a slider moved in a straight line along the guide, a driving mechanism for generating a driving force by magnetic interaction of the slider with the guide so as to linearly drive the slider, and a magnetic measurement unit having a magnetic scale and a detector, which are opposed to and change a relative position relative to each other in order to obtain the relative position of the slider relative to the guide, wherein the opposing direction of the magnetic scale and the detector is the direction of the outer circumference of the guide, and the detector detects a signal from the magnetic scale in accordance with the relative position of the slider, whereby the relative position of the slider is obtained.

In accordance with the invention, since the opposing direction of the magnetic scale and the detector is the direction of the outer circumference of the guide, even when the magnetic scale is used in an environment in which the guide generates a magnetic force, the direction of the magnetization of the magnetic scale and the direction in which the detector detects the magnetic force intersect the lines of magnetic force, so that interference of the external magnetic field with the detected signal is reduced. Therefore, even in the presence of an external magnetic field, the relative position of the slider can be measured accurately by the magnetic measurement unit and the positional precision of the linear drive apparatus can be improved.

It is also possible, in the linear drive apparatus, that the magnetic body comprises a permanent magnet or a center bar magnetized by ambient magnetic force.

In accordance with the invention, the opposing direction of the magnetic scale and the detector is generally in a direction perpendicularly intersecting the radial lines of magnetic force generated in radial direction of the permanent magnet or the center bar of the magnetic body. Therefore, the relative position of the slider can be accurately measured even in the presence of a strong magnetic force.

It is also possible, in the linear drive apparatus, to support the slider by means of a pneumatic bearing.

In accordance with the invention, the influence of vibration due to the rigidity of the processing machine, etc. can be reduced so as to permit high precision processing of precision parts. A synergistic effect with a linear motor mechanism will permit highly efficient and high precise processing.

BRIEF DESCRIPTION OF THE DRAWINGS

The above object, and other objects, features and advantages of the present invention will become more apparent from the following description of the preferred embodiments with reference to the appended drawings, in which.

DETAILED DESCRIPTION OF THE INVENTION

Figure 1:
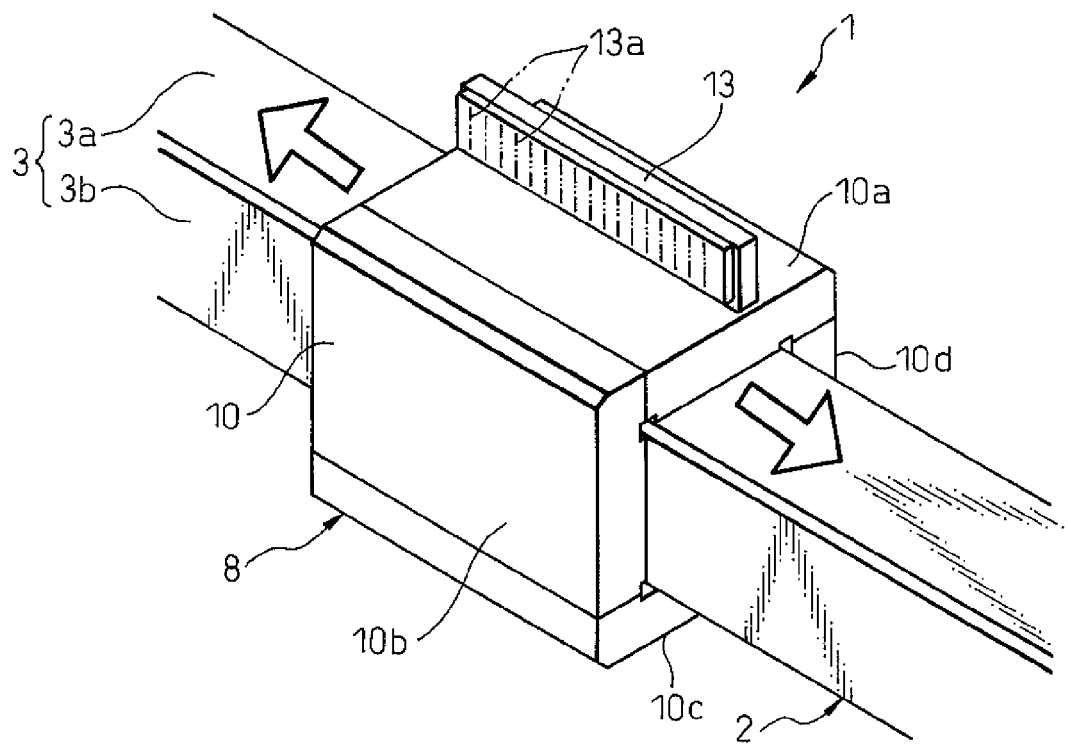
FIG. 1 is a perspective view showing a linear drive apparatus according to an embodiment of the present invention.

A linear drive apparatus according to the present invention will be now described in detail with reference to the drawings. A linear drive apparatus 1 of the present embodiment is comprised of a base (not shown), a guide 2 fixed to the base, a slider 8 guided by the guide 2 to be moved in relative movement, a linear motor mechanism 11 that linearly drives the slider 8 by means of magnetic interaction of the slider 8 and the guide 2, a magnetic measurement unit 12 for measuring the relative position of the slider 8, and a pneumatic bearing for supporting the slider 8 by supplying compressed air into the gap between the opposing surfaces of the guide 2 and the slider 8.

As shown in FIG. 1, the guide 2 has a rectangular shaped cross section and extends horizontally in a straight line from one side to the other side of the base. The outer surfaces 3 of the guide 2, that is, the upper and lower surfaces, and both side surfaces, form pairs of bearing surfaces 3a to 3d. Each of the bearing surfaces 3a to 3d is opposed to each of the opposing surfaces of the slider 8 via a specified bearing gap.

In a sectional view (see FIG. 3), there is a cylinder-shaped iron core (magnetic body) 5 inserted in the center portion of the guide 2, and this iron core can be magnetized in an arbitrary direction. The iron core 5 is a construction member of a linear motor mechanism formed by the guide 2 and the slider 8, and is strongly magnetized in an axial direction when the slider 8 is moved in a straight line along the guide 2. The iron core 5 may also be magnetized in a radial direction under the influence of an external magnetic field, and the iron core itself can generate a magnetic field in the surrounding. The strength of the radial magnetic field generated by the iron core 5 may become strong enough to influence the magnetic scale 13 arranged in the vicinity of the slider 8. In the magnetic measurement unit 12 of the present embodiment, however, the opposing direction of the magnetic scale 13 to the magnetic head (detector) 14 is disposed so as to be in the circumferential direction of the guide 2, so that the external magnetic field cannot produce an adverse influence on the measurement.

Figure 2:
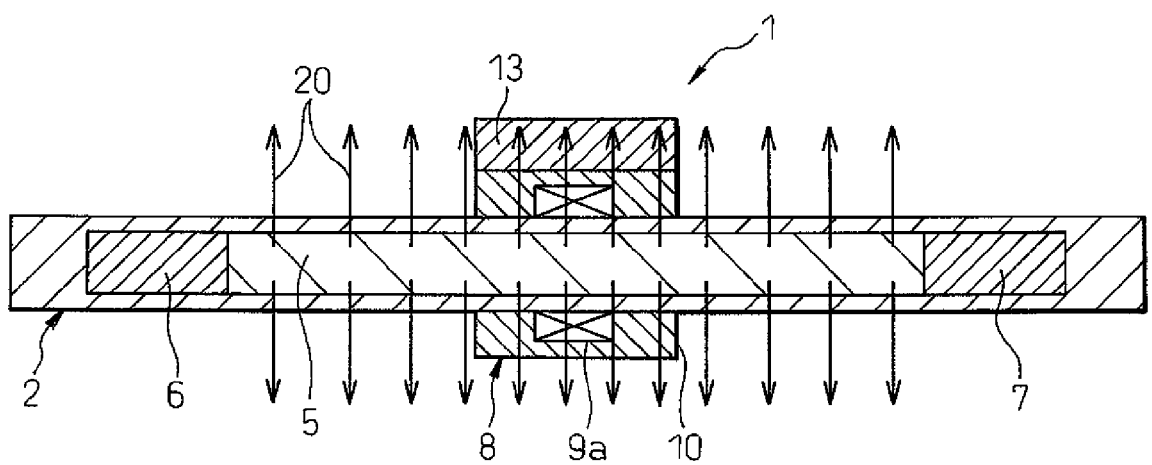
FIG. 2 is a sectional view showing the longitudinal section of the linear drive apparatus of FIG. 1.

As shown in FIG. 2, the guide 2 has permanent magnets 6, 7 on opposite ends of the iron core 5. The two permanent magnets 6, 7 function by utilizing the repulsive property of the magnets as a limiter of the linear drive apparatus 1, and reducing the counter force at the time of the reversal of the slider 8 and by adding a driving force in the reverse direction. With the function as a limiter, the possible stroke of the reciprocating movement of the slider 8 can be defined so as to be a specified length (processing length, measurement length), so that safe processing or measurement can be performed without requiring a special stopping device. By reducing the counter force and adding the driving force in the reverse direction, heat generation of the slider 8 at the time of reversal of the moving direction can be avoided, and highly efficient and precise processing can be performed with a small machine of low rigidity. In particular, this is advantageous when a number of small articles are repeatedly processed over a long period of time.

The slider 8 has a rectangular shaped frame with openings formed both at front and rear ends, and is composed of an inner frame 9 having a coil 9a and an outer frame 10. The outer frame 10 is composed by assembling the separately formed four outer frame members 10a to 10d into a frame. Assembling of the slider 8 is performed using bolts (not shown) carefully so as to form a specified bearing gap between the opposing surfaces of the slider 8 and the guide 2.

Each of the outer frame members 10a~10d is provided a flow channel (not shown) for supplying pressurized gas (compressed air) from the outside into the region between the opposing surfaces of the guide 2 and the slider 8 so as to form a bearing gap in this region. By the pressurized gas supplied between the opposing surfaces, the slider 8 is supported by magnet suspension, and mechanical torque ripple due to the mutual friction between the guide 2 and the slider 8 is thereby reduced. The bearing gap is set to a few μm to a few tens of μm, whereby it becomes possible to smoothly move the slider in a straight line.

Figure 3:
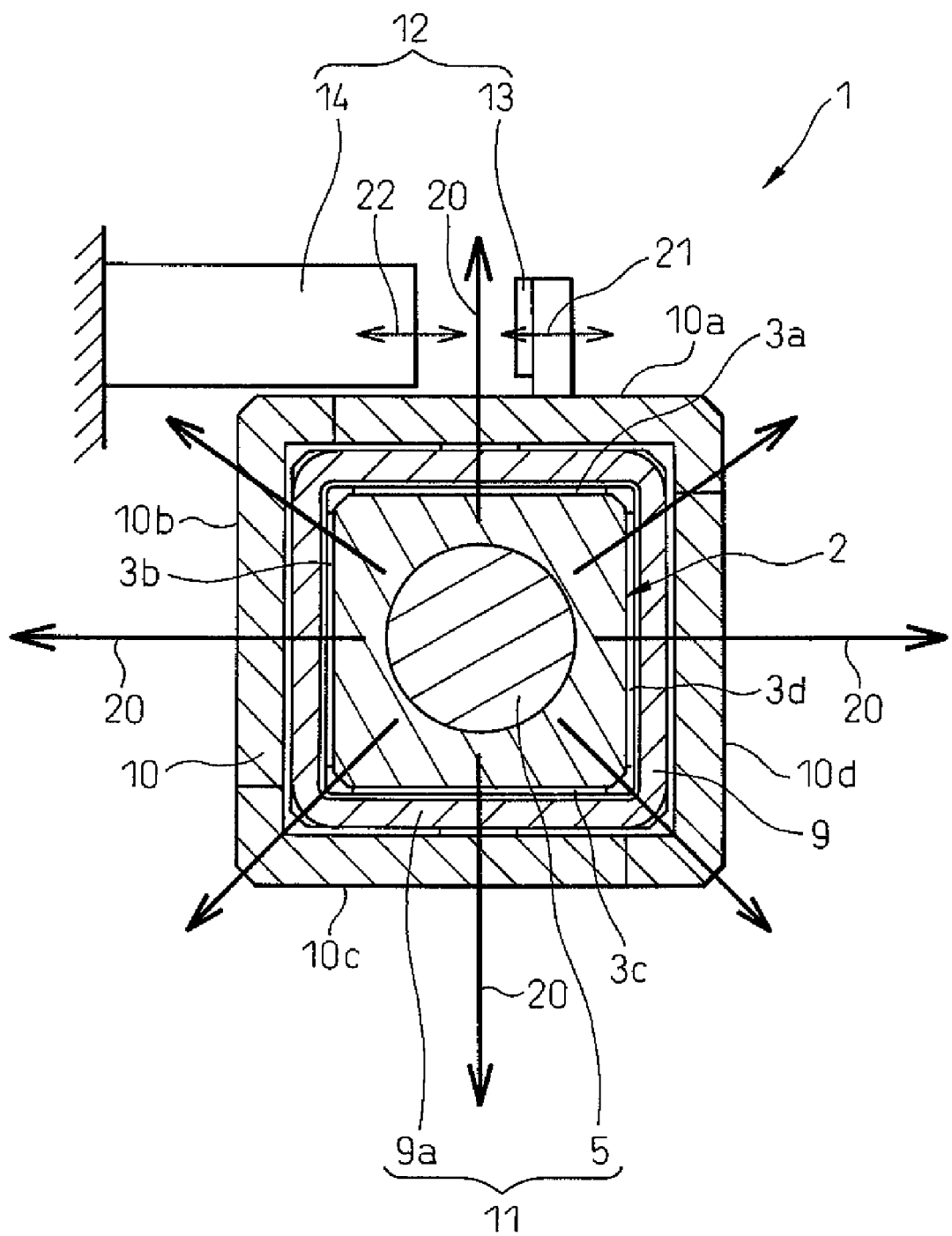
FIG. 3 is a sectional view showing the transverse section of the linear drive apparatus of FIG. 1.

As shown in FIG. 3, on the outer surface of the outer frame member 10a located above the slider 8, a magnetic scale 13 is provided vertically at a position opposed to a magnetic head 14. The direction of opposition of the magnetic scale 13 and the magnetic head 14 coincides with the circumferential direction of the guide 2. As shown in FIG. 2, this direction is a direction intersecting the lines of magnetic force 20 of the iron core 5 magnetized in the radial direction, so that interference of the signal detected by the magnetic head 14 with the lines of magnetic force 20 of the iron core 5 can be reduced.

The linear motor mechanism 11 is a driving mechanism that converts electrical energy to mechanical energy by magnetic interaction of a magnet (not shown) and the iron core 5 and the coil 9a so as to move the movable member in a straight line relative to the fixed member. In the present embodiment, the magnetized iron core 5 and the magnet are provided on the guide 2, and the coil 9a is provided on the slider 8 (see FIG. 3). Since the linear motor mechanism 11 of the present embodiment has the same construction as the well-known linear motor mechanism, further explanation thereof is omitted.

The magnetic measurement unit 12 is composed of a magnetic scale 13, a magnetic head 14, a signal transformation apparatus (not shown), and a display (not shown), and measure the position of the slider 8 moved relative to the guide 2. The magnetic scale 13 is a scale having a magnetic lattice fringe 13a as a graduated scale, and is formed, for example, by adhering a rubber magnet onto a stainless steel plate and then magnetizing it. The magnetic scale 13 is provided so as to project above the surface of the outer frame member 10a of the slider 8 such that the adjoining direction of each of the magnetic lattice fringes (direction of graduation of the scale) coincides with the moving direction of the slider 8. Although the magnetic lattice fringes 13a cannot be visualized, in order to facilitate understanding of the present invention, they are shown as imaginary lines in FIG. 1 of the present embodiment. Magnetization direction 21 of the magnetic scale 13 is a direction intersecting the lines of magnetic force 20 of the iron core 5.

The magnetic head 14 is a detecting section such as a magnetic resistance element utilizing the well-known magnetic resistance effect or a Hall device utilizing the Hall effect, and is fixed to the wall portion of the base (not shown) so as to be opposed to the magnetic scale 13. The magnetic force detecting direction 22 of the magnetic head 14 is in a direction intersecting the lines of magnetic force 20 of the iron core 5. The signal from the magnetic scale 13 in accordance with the position of the slider 8 is detected by the magnetic head 14. In the signal transformation apparatus, the signal detected by the magnetic head 14 is subjected to signal processing. The measured value obtained by the signal processing is displayed on the display device.

As described above, since, in accordance with the present embodiment, the opposing direction of the magnetic scale 13 and the magnetic head 14 for measuring the position of the slider relative to the guide 2, is the outer circumferential direction of the guide 2, the direction of the magnetization 21 of the magnetic scale 13 and the magnetic force detecting direction 22 of the magnetic head 14 intersect (perpendicular to) the lines of magnetic force emanating from the guide 2 in a radial direction (mainly the lines of magnetic force of the iron core), so that interference of the lines of magnetic force 20 emanating from the guide 2 with the detection signal is reduced. Therefore, it is possible to measure the relative position of the slider 8 accurately even in the presence of strong magnetic field near the magnetic scale 13. Thus, reliability of the position measurement of the position of the slider 8 can be improved even in an environment where coolant, dust, etc. are present. By the synergistic effect of the pneumatic bearing and the linear motor mechanism 11, a light guide plate of a liquid crystal display device (not shown), etc. can be repeatedly processed efficiently and with precision over a long time.

The present invention is by no means limited to the above embodiments, but can be implemented in various modifications without departing from the concept of the invention. For example, although, in the present embodiment, the magnetic scale 13 is provided on the slider 8 and the magnetic head 14 is provided on the base, it is also possible that the magnetic scale is provided on the base and the magnetic head is provided on the slider. Although the linear drive apparatus 1 of the present embodiment comprises a linear motor mechanism 11 as a driving mechanism, it is also possible to comprise another driving mechanism such as a rotary motor mechanism or a ball screw mechanism in place of the linear motor mechanism 11.

The invention claimed is:

1. A linear drive apparatus comprising:
a guide;
a slider moved along the guide;
a driving mechanism for driving the slider in a straight line, and
a magnetic measurement unit having a magnetic scale and a detector that are opposed and change a relative position relative to each other in order to obtain the relative position of the slider relative to the guide,
wherein a direction of opposition of the magnetic scale and the detector intersects a direction of lines of magnetic force of a surrounding external magnetic field, and the detector detects a signal from the magnetic scale in accordance with the relative position of the slider,
whereby the relative position of the slider is obtained.

2. A linear drive apparatus according to claim 1,
wherein the slider is supported by a pneumatic bearing.

3. A linear drive apparatus comprising:
a guide having an internal magnetic body;
a slider moved in a straight line along the guide;
a driving mechanism for generating a driving force by magnetic interaction of the slider with the guide so as to linearly drive the slider; and
a magnetic measurement unit having a magnetic scale and a detector which are opposed to each other and change a relative position relative to each other in order to obtain the relative position of the slider relative to the guide,
wherein an opposing direction of the magnetic scale and the detector is a direction of an outer circumference of the guide, and the detector detects a signal from the magnetic scale in accordance with the relative position of the slider,
whereby the relative position of the slider is obtained.

4. A linear drive apparatus according to claim 3,
wherein the magnetic body comprises a permanent magnet or a center bar magnetized by a surrounding magnetic force.

5. A linear drive apparatus according to claim 3,
wherein the slider is supported by a pneumatic bearing.

* * * * *